Jan. 15, 1957  F. K. H. NALLINGER  2,777,332
DRIVE, PARTICULARLY FOR VEHICLES
Filed Feb. 17, 1950  2 Sheets-Sheet 1

INVENTOR.
FRIEDRICH K. H. NALLINGER
BY Dicke and Padlon
ATTORNEYS.

Jan. 15, 1957　　　F. K. H. NALLINGER　　　2,777,332
DRIVE, PARTICULARLY FOR VEHICLES
Filed Feb. 17, 1950　　　2 Sheets-Sheet 2

INVENTOR
FRIEDRICH K. H. NALLINGER

BY　*Dickey and Padlon*
ATTORNEYS

United States Patent Office 2,777,332
Patented Jan. 15, 1957

2,777,332
DRIVE, PARTICULARLY FOR VEHICLES

Friedrich K. H. Nallinger, Stuttgart, Germany

Application February 17, 1950, Serial No. 144,827

Claims priority, application Germany February 19, 1949

28 Claims. (Cl. 74—368)

An object of this invention is a drive, particularly designed for motor vehicles.

Free wheeling units which are built into transmissions are known in the prior art. Such free wheeling units usually operate in such a manner as to cause a driving coupling to take place between the members of the drive unit when the power flow is normal, that is, when the car is normally driven by the engine, whereas when the power flow is reversed, that is, when the power flow takes place from the wheels to the engine, for example, as a result of coasting downhill or of throttling the engine, the driving connection is engaged, namely the driving members of the drive unit idle or free wheel relative to one another. The advantage of such free wheeling units consists in that gear shifting is almost as slight and noiseless as in the case of positive-synchronized devices, their construction being generally considerably simpler than the positive, synchronized devices. Their use results moreover in a reduction of fuel consumption.

However, from a technical point of view of the operation, the disadvantages of free wheeling units, as they are commonly arranged, consist in that the natural braking action of the driven engine is eliminated due to the disengagement of the drive with an over-running drive axle or shaft. In addition thereto, when again pressing down the accelerator pedal after a condition of free wheeling, the engine itself must each time be accelerated from the idling speed thereof to a speed corresponding to the gear ratio and the speed of the car. Where free wheeling units are not very accurately adjusted or the engine is cold, stoppage of engine is likely to happen. These three essential disadvantages, in turn, result in further disadvantages, such as lack of driving safety, increase of wear due to overspeeding of engine, jamming of traffic, etc.

With the above in view, it is another object of this invention to combine the advantages of free wheeling as regards improvement of gear-shifting ease, fuel economy and constructional simplification, the hitherto experienced disadvantages of free wheeling being at the same time eliminated, with the safety of operation offered by the commonly used transmission units which are not equipped with a free wheeling unit, and at the same time to obtain new advantages as regards driving operation.

In particular, one feature of this invention consists, accordingly, in that the drive is provided with two free wheeling units which are designed and/or arranged opposite to each other in such a way that one of the free wheeling units will provide for a transmission of driving power in a direction which is opposite to the drive power transmission provided for by the other free wheeling unit. The two free wheeling units are herein particularly arranged in two individual drive branches coupled together side by side in a way similar to a two-speed transmission. Each of the two free wheeling units is herein substantially arranged in that one of the two drive branches as performs the transmission of power, when power flow occurs in the direction assigned to it, for example from the engine to the drive axle or shaft for one of the two free wheeling units which will be referred to in the following description as the "normal free wheeling unit" and from the drive axle or shaft to the engine for the other free wheeling unit called in the following description the "counter-free wheeling unit," whereby the transmission ratio obtained in one drive branch may be lower than that obtained by the reduction ratio in the other drive branch. The result of this arrangement is that such free wheeling unit as is in effective operation at a given time, will cause the drive members operating together through the other free wheeling unit to idle freely relative to each other, thus preventing the drive unit to lock.

Besides the well-known advantages obtained by using a free wheeling unit in a drive unit, one of the main advantages obtained by this invention consists in that when reversion of power flow occurs, particularly when the engine is over-run by the drive members coupled to the drive axle of the motor vehicle, the transmission of driving power will not be interrupted, rather, it will be taken over by the counter-free wheeling unit. The result will be that even upon reversion of power flow, as it occurs such as when taking the foot off the gas pedal or when the vehicle is coasting downhill, the engine will remain coupled to the driving vehicle, due to its driving connection to same by one of the free wheeling units. It then will be possible to use the engine as a vehicle brake and it will not be necessary to accelerate it from its idling condition each time when again pressing down the accelerator. The danger of engine stoppage will also be prevented. Moreover, the arrangement may be provided in such a way that the clutching members, such as gears, claws or the like, will not be subjected to any torque, notwithstanding the presence of flow of power from the engine, thus enabling to move them into engagement smoothly and noiselessly.

Another result can moreover be obtained by the invention, by arranging the free wheeling unit and the counter-free wheeling unit in such a suitable way as to cause an upshifting from a low range gear ratio, power flow being normal, into a higher one to occur automatically upon reversion of power flow, so that the engine will be driven by the vehicle in a particular economical way from both the viewpoints of wear and of fuel consumption. This may be accomplished, for instance, if the former is a direct drive and the latter an overdrive, or the former a low range speed and the latter a direct drive. In any case the counter-free wheeling unit will suitably be arranged in such a drive assembly or in such a gear ratio of the main transmission, as will cause the engine to be driven at a lower speed when the driving power flows from the driven axle or shaft to the engine. If the free wheeling unit is so arranged as to interrupt the transmission of power from the engine to the vehicle also in the low range speeds, a reduced fuel consumption will result therefrom also for the low range speeds, which is very important chiefly when driving in heavy traffic.

The two-speed transmission including the two free wheeling units can be used as an additional transmission unit to a main transmission. It may be attached to the latter in series or parallel arrangement, or be integral with the main transmission so as to form a complete unit from the operational or constructional point of view in such a way as to constitute the gears of the two-speed transmission or only one of them at the same time the gears of the main transmission or act jointly with all or part of them. The two-speed transmission including the free wheeling units can be attached in front or behind the main transmission. In the case of a parallel or partly parallel arrangement, it can be arranged in such a way that upon reversion of power flow, the driving power of the vehicle is transmitted directly to the main clutch by evading the transmission or directly to the engine in by-passing relationship with the main clutch.

It will moreover be suitable to so design one of the two free wheeling units or both of them as to make it possible to lock one or both of them directly or through a locking device designed to make the free wheeling unit inoperative and attached in parallel to it. This applies to the free wheeling unit which provides for the transmission of driving power, power flow being normal, when the free wheeling unit is supposed to transmit a driving momentum in the two directions, particularly to the end of permitting a more intensive use of the engine as a brake, as well as to the counter-free wheeling unit, when the same is supposed to be used as a power transmission member of speeds from a transmission gear unit, and thus also when power flow is normal. Locking can be performed by claw clutches, friction clutches, or any other suitable means, for instance also by using synchronized clutches or the so-called "slot clutches" which do not permit the clutch, such as for instance, a claw coupling, to engage unless the clutch members which are supposed to engage are rotating at the same rotational speed, or an inversion of torque occurs. If claw couplings are used, the same may suitably be, ratchet wheel-like, bevelled in one circumferential direction. The free wheeling unit itself may also be designed as an over-running claw coupling with unilaterally bevelled claws, which transmit the torque in one direction of rotation only. If an intensified braking action of the engine is required when driving down steep grades, and no locking of the free wheeling unit, which provides for the drive transmission in the normal direction of power flow, is desired, the low range speeds or the lowest speed of the transmission unit may be excluded from the free wheeling action by restricting the free wheeling action to the high range speeds. At the present time, however, brakes are as a rule so sturdily designed that one may do without using the low range speeds when having recourse to the braking action of the engine.

Another object of the invention is a further development of the drive arrangement outlined above by taking into consideration a drive the reverse direction of rotation, driving power coming either from the engine or from the vehicle, no matter how the reverse speed gearing is arranged with respect to the free wheeling unit and the counter-free wheeling unit.

In principle, the reverse speed gearing can be attached to the free wheeling unit in the same manner as a forward speed gearing, either in series or parallel or else in mixed arrangement. In the case of a series arrangement, the reverse speed gearing, i. e. such speed gearing as reverses the direction of rotation of drive, can be attached either between the engine and the free wheeling unit or between the latter and the drive axle.

The conditions under which free wheeling units operate depend upon the arrangement of the reverse speed gearing. Where the reverse speed gearing is attached behind the free wheeling unit it is not, as a rule, absolutely necessary to provide one of the two free wheeling units with a special locking or unlocking device for the reversion of the direction of the driving rotation, since reversion of the direction of the driving rotation does not affect the free wheeling unit when shifting into the reverse speed. It is true that even with this arrangement, cases might occur in which it would be suitable or even necessary to unlock the free wheeling unit in order to make gear shifting easier or practicable, such as where the car tries to roll backward with a forward speed engaged when on a grade. Kinematic conditions entail, however, the necessity to take substantial steps, when reverse speed gear is attached in front of the free wheeling gear or of one of the two free wheeling units, or when it is attached in parallel to the free wheeling gear. The invention provides, accordingly, among others, in particular, for the following:

(1) An unlocking of one of the two free wheeling units or an unlocking of the one and a locking of the other of the two free wheeling units, the reverse speed gear being placed in front of them.

(2) An interruption of the drive connection between the free wheeling unit and the counter-free wheeling unit or a respective unlocking of one of the two free wheeling units, the reverse speed gear being attached in a parallel arrangement.

(3) In the event that the drive assembly of the reverse speed gearing includes only one of the two free wheeling units, a locking of this free wheeling unit.

Drive in the reverse direction of rotation, either from the engine or from the vehicle is hereby also rendered possible in any case without causing a locking or a complete drive interruption when a reversion of the direction of the driving rotation occurs. Unlocking or locking operations may suitably be combined with the gear shifting into reverse, thus avoiding an unintentioned or undesired operation of the unlocking or locking device.

To explain the invention, some embodiments are diagrammatically outlined in the drawing:

Figs. 1 and 2 illustrate diagrammatically a two-speed transmission unit, designed for a motor car equipped with free wheeling unit and counter-free wheeling unit. In Fig. 1 power flows occurs from the engine to the wheels, whereas in Fig. 2 power flow occurs from the wheels to the engine.

Figs. from 8 to 11 show a drive arrangement according to Figs. 1 and 2, with a reverse speed gearing attached in front of the free wheeling gear, in four different drive conditions, wherein for the sake of simplicity in Figs. 9 and 11 the reverse speed gearing has been omitted, whereas in Figs. 9, 10 and 11 the locking devices for the free wheeling units are omitted.

Figure 12:
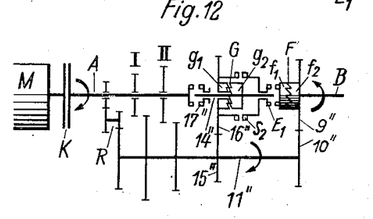
Fig. 12 shows a drive arrangement with a reverse speed gearing which is in a parallel arrangement to the free wheeling gear, wherein the free wheeling units are at the same time arranged in two forward speed gears of the transmission unit.
Figure 13:
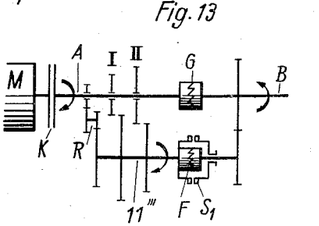
Fig. 13 shows a drive arrangement, wherein only the normal free wheeling unit is arranged in the drive assembly of the reverse speed gearing, whereas the counter-free wheeling unit is in a parallel arrangement to the latter.

In the various views of the drawing, let A stand for the drive shaft of the transmission unit driven for example, by the engine, B for the axle or driven shaft transmitting the power e. g. to the drive axle of the vehicle, F for the normal free wheeling unit, ensuring a transmission of driving power when power flow is normal, with coupling halves, $f_1$ and $f_2$, G for a counter-free wheeling unit, providing for a drive power transmission when power flow occurs in reverse direction, with coupling halves, $g_1$ and $g_2$, M for the engine, K for the main clutch and R for the reverse speed gearing, if any. Some figures show, moreover, a locking device, $S_1$, for the normal free wheeling unit, F, a locking device, $S_2$, for counter-free wheeling unit, G, an unlocking device, $E_1$, for the normal free wheeling unit, F, and an unlocking device, $E_2$, for counter-free wheeling unit, G. To simplify things, unlocking devices, $E_1$ and $E_2$, are indicated in Figures from 8 to 11 as friction clutches, but it is obvious that they can be also claw couplings, as shown in Figures 12 and 13, or any other system. The directions of rotation of the individual shafts are indicated by curved arrows. In Figs. 1 and 2, and 8 to 11, power flow is indicated by arrows on shafts A or $a_1$ and B.

Figure 5:
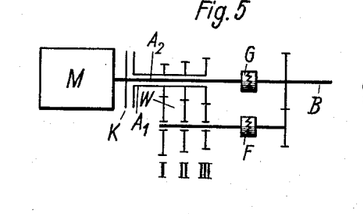
Fig. 5 shows a drive arrangement, wherein the counter-free wheeling unit is placed in a drive assembly by-passing the clutch and the transmission unit.
Figure 6:
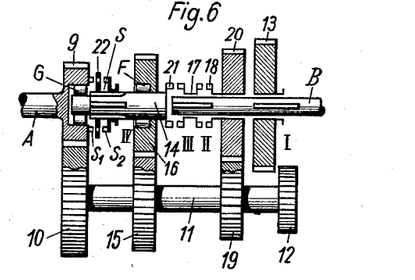
Figs. 6 and 7 show two other drive arrangements, wherein the free wheeling unit and the counter-free wheeling unit are arranged in the two high range speed gears of the transmission unit.
Figure 7:
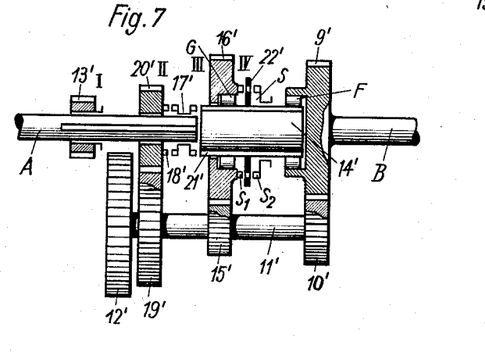

Just to show the way they operate, the free wheeling units are outlined in Figs. from 1 to 5 from 8 to 13 as being over-running claw couplings, whereas in Figs. 6 and 7 they are represented as clamp roller ratchets, but any other type of free wheeling unit designed for a power transmission in one direction only can obviously be used. The clutch halves of the over-running claw couplings are constantly trying to engage with each other, for example, due to the pressure of a spring. However, for clearness' sake this has not been indicated in the drawing.

Figure 1:
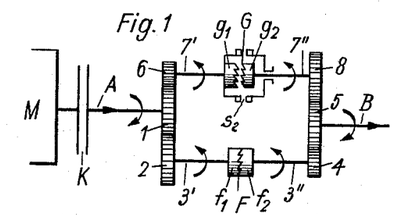
Figure 2:
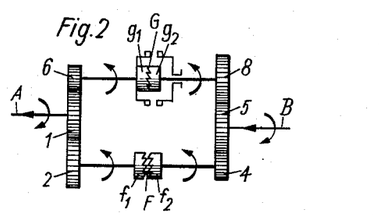

Figs. 1 and 2 illustrate the principle on which the arrangement of free wheeling units, F and G, is based: Fig. 1 shows the driving conditions when power flow is normal, i. e., when it comes from the engine, whereas Fig. 2 shows driving conditions when power flow is reverse, i. e., when it comes from the vehicle. Shaft, A, driven by engine, M, through clutch, K, drives through gear, 1, on the one side, through gear, 2, shaft, 3 consisting of shaft sections 3' and 3'' and gears, 4, 5; and on the other side, through gear, 6, shaft, 7 consisting of shaft sections 7' and 7'' and gears, 8, 5, axle shaft, B. Gears, 1, 2, 4, 5, form herein a low range speed gearing with a speed reduction ratio, whereas gears 1, 6, 8, 5, are a high range speed gearing with a speed increasing ratio. Shaft sections, 3', 3'', can be coupled together by free wheeling unit, F, comprising the two coupling halves, $f_1$ and $f_2$; shaft sections, 7', 7'', can be coupled together by counter-free wheeling unit, G, comprising the two coupling halves, $g_1$ and $g_2$. Counter-free wheeling unit, G, can, moreover, be locked, for example, by means of a locking clutch, for instance a claw coupling or friction clutch, $S_2$, consisting of a coupling half, $s_1$, attached to shaft 7' and a coupling half, $s_2$, which is so attached to shaft 7'' as to permit it to shift axially only but prevent it from rotating. A respective locking device may be provided for free wheeling unit, F.

In Fig. 1 it has been taken for granted that engine, M, drives the vehicle, thus causing shaft, A, to rotate clockwise. The directions of rotation indicated are correctly interpreted when the arrangement is viewed from the engine. Shafts, 3 and 7, will hence turn counter-clockwise. Consequently, the driving power is transmitted from free wheeling unit, F, through gears, 1, 2 and 4, 5 on to drive shaft, B. Also clutch half, $g_2$, of counter-free wheeling unit, G, is driven from gear, 5, through pinion, 8; the rotational speed of $g_2$ will be in accordance with the reduction ratio obtained by gears, 1, 2, 4, 5, 8, i. e. it will revolve counter-clockwise at a lower rotational speed than coupling half, $g_1$, which is driven—also counter-clockwise—by gears, 1, 6, according to their speed increasing ratio. The claws, operating as a free wheeling, of counter-free wheeling unit, G, are herein bevel-shaped in a manner opposite to the bevel shape of the claws of free wheeling unit, F, in such a way that coupling half, $g_1$, is permitted to overrun counter-clockwise the other clutch half, $g_2$, as shown by the arrows without transmitting any torque nor producing any clamping effect.

Where reversion of power flow occurs, for example, when taking the foot off the gas pedal or as a result of the vehicle rolling faster when coasting downhill, coupling half, $f_2$, will overrun counter-clockwise coupling half, $f_1$, of free wheeling unit, F, whereas the rotational speed of coupling half, $g_2$, will approach that of coupling half, $g_1$, of counter-free wheeling unit, G, until the two coupling halves will turn at the same rotational speed, i. e. when the difference between the rotational speeds of axle shaft, B, and drive shaft, A, will have reached a predetermined value. The result will be that if a further relative acceleration of axle shaft, B, occurs, driving power will be transmitted in the reverse direction from B through 5, 8, G, 6 and 1 to shaft A, or, through coupling, K, to engine, M (Fig. 1). Clutch half, $f_2$, will then rotate counter-clockwise with a predetermined speed ratio ahead of coupling half, $f_1$, of free wheeling unit, F.

The two-speed transmission unit illustrated in Figs. 1 and 2 will hence, taking into account the hitherto outlined prerequisites, always transmit driving power from engine, M, to the axle through free wheeling unit, F, and cause an automatic shifting to counter-free wheeling unit, G, as soon as shaft, B, overruns the engine, M, by a predetermined speed. To make it possible to use the transmission unit as a two-speed transmission when power flow occurs in the normal direction, counter-free wheeling unit, G, may be locked by clutch, $S_2$. In this case, i. e. upon engagement of locking clutch, $S_2$, driving power will be transmitted from M to B through counter-free wheeling unit, G, also when power flow occurs in the normal direction, i. e. when the engine is driving, in which case clutch half, $f_2$, will be driven counter-clockwise (according to the speed increasing ratio of gearing, 1, 6, 8, 5, 4, at a rotational speed which will be higher than that of clutch half, $f_1$, thus permitting free wheeling between these two clutch halves of free wheeling unit, F, to operate. If the free wheeling unit F is provided with a suitable locking clutch and is engaged, engine, M, will be driven, when reversion of power flow occurs, i. e. from the vehicle wheels to the engine at a rotational speed which will be higher than the speed obtained in the case of a transmission driving power through, G. Hereby a stronger braking action can be obtained although this would be to the detriment of fuel consumption and wear. In this case, clutch half, $g_1$, will, according to Figure 1, rotate counter-clockwise at a higher rotational speed than clutch half $g_2$: this is rendered possible by bevel-shaping the claws.

Figure 3:
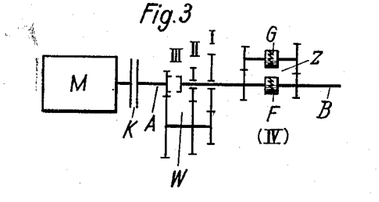
Fig. 3 shows a drive arrangement with a two-speed transmission unit which is attached to the rear of the main transmission unit and includes the two free wheeling units.

The embodiment according to Fig. 3 shows a main transmission unit, W, attached in front of two-speed transmission unit, Z, with the two free wheeling units, F and G. The two-speed transmission unit which may, as for the rest, be constructed similarly to Figs. 1 and 2, consists in this case of a direct drive with free wheeling unit, F, and an over-drive with counter-free wheeling unit, G. The transmission unit will be, for instance, designed as a three-speed transmission, wherein the third speed is a direct drive. Each of the three speeds of transmission unit, W, can operate together with the two speeds of the two-speed transmission unit, Z, in such a way that when power flow occurs from the engine, the torque is transmitted by free wheeling unit, F, and when power flow is reversed, i. e. when it comes from the vehicle axle, the torque is transmitted by the counter-free wheeling unit through any of the speeds of the main transmission unit. If a reverse speed has to be provided, it can be attached, for example, behind the two-speed transmission unit, Z. This arrangement renders it possible to profit from the advantages offered by the free wheeling and counter-free wheeling units for the low range speeds too.

Figure 4:
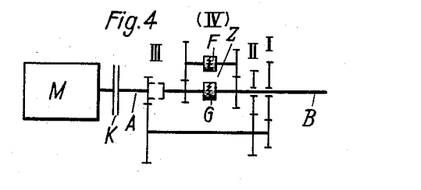
Fig. 4 shows a drive arrangement, wherein the free wheeling unit (normal free wheeling unit) and the counter-free wheeling unit are arranged in the two high range speed gears of the transmission unit.

In Fig. 4, two-speed transmission unit, Z, is built into the main transmission unit in such a way as to operate together with the third, direct speed (III), or to subdivide the third speed into a third and fourth speed, whereas it is in a parallel arrangement to the first and second speeds (I, II). The first and second gearings are herein driven through the countershaft of the main transmission unit, so as to obtain a positive drive, whatever the direction of power flow is, thereby also permitting use of the engine as a brake with an increased braking action by using these gears.

In the embodiment according to Fig. 5, free wheeling unit, F, is arranged in transmission unit, W, between the gears to be engaged upon shifting and the constantly engaged gear in such a way as to operate in all of the three gears (I, II, III) of the transmission unit. Counter-free wheeling unit, G, is, on the other hand, attached to a drive shaft, $A_2$, which is in a parallel arrangement to drive shaft, $A_1$, to be coupled to the engine through clutch, K of transmission unit, W. Shaft, $A_1$, couples engine, M, through counter-free wheeling, G, direct to driving shaft, B, in by-passing relationship to the transmission unit and clutch, K, as soon as reversion of power flow occurs, i. e. when the driving power comes from the vehicle. In this case, the engine M is thereby used as a brake, and it is directly coupled to the driving axle. Since the transmission of driving power from axle shaft, B, and transmission unit, W, will be interrupted by free wheeling unit, F, or, under certain circumstances, by the clutch, it will also be possible to gearshift smoothly and noiselessly in any way desired. In some cases, one shaft only—to be coupled to the engine through clutch, K—can be provided in lieu of shafts, $A_1$ and $A_2$. In this case, it is true that counter-free wheeling unit, G, will also by-pass the transmission, W, but not clutch, K.

Also in the case of Fig. 5 and in that of the latter alternative, free wheeling units F and G can be so designed as to make it possible to lock them. To render it possible, for example, so as to profit also from the braking action of the engine in the low range speeds, free wheeling unit, F, may be provided with a locking device. In this case driving power will be transmitted—clutch, K, being engaged—from the vehicle axle or axle shaft, B, to engine, M, through free wheeling unit, F, and transmission unit, W, in such a way that the R. P. M. of engine will be higher than if it were directly driven through counter-free wheeling unit, G. The transmission of driving power through counter-free wheeling unit, G, would hence be interrupted.

As a further embodiment, Fig. 6 shows a four-speed transmission unit, wherein drive in the first and second speed positions (I, II) occurs without free wheeling action, whereas free wheeling unit, F, is coupled to the gearing of the third speed position (III) and the counter-free wheeling, G, to the gearing of the fourth, direct speed (IV).

The transmission unit will operate as follows: in the first speed position, driving power is transmitted from the shaft, A, through gears, 9, 10, countershaft, 11, gear 12, and shifting gear 13, to axle shaft, B. Shaft, 14, arranged between shafts, A, B, and axially thereto, will rotate through gears, 15 and 16, and free wheeling unit, F, in the same direction of rotation as shaft, A, but at slower a speed than the latter. Counter-free wheeling unit, G, will hence cause shafts, A and 14, to idle freely to each other. Clutch, 17, between shafts, 14 and B, is disengaged.

To gearshift into second speed (II), gear, 13, must be disengaged from gear, 12, and clutch, 17, must be engaged with the claws of the clutch half, 18. Countershaft, 11, and axle shaft, B, will consequently be coupled through gears, 19 and 20.

The third speed will be obtained by moving into engagement clutch, 17, with claws, 21, provided on intermediate shaft, 14, thereby causing shafts, 14 and B, to be coupled. Driving power will therefore be transmitted from shaft, A, through gears, 9, 10, 15, 16, and through free wheeling unit, F, to shaft, 14, and thence through clutch, 21, 17, to axle shaft, B. When reversion of power flow occurs, i. e. when power flow comes from the driving vehicle, free wheeling unit, F, will cause gear, 15, and shaft, 14, to disengage. The transmission of driving power will then remain interrupted first, until shaft, B, has accelerated, or shaft, A, decelerated to such an extent that the two shafts will rotate at the same rotational speed. From this moment on, i. e. when shaft, B, will over-run shaft, A, the two shafts will be coupled together by counter-free wheeling, G, so that driving power will be transmitted directly from the vehicle to the engine. Upon accelerating the engine again, and as soon as the drive occurs from the engine again, a downshifting into the third speed will automatically occur.

Yet, to render it also possible to transmit driving power from the engine directly to shaft, B, there is provided in this embodiment a locking clutch, S, which will lock the counter-free wheeling unit, G, as soon as clutch piece, $s_2$, will engage with claws, $s_1$, provided at gear 9, or at shaft, A, respectively. To obtain a noiseless gearshift in the embodiment outlined, locking clutch, S, is of the so-called "slot clutch" type. To this end, a locking disc, 22, is provided between clutching members, $s_1$ and $s_2$. Disc, 22, is arranged on shaft, 14, with a small clearance in the circumferential direction, and is provided with apertures designed for claws, $s_2$, to pass through. As long as the counter-free wheeling unit will maintain shaft, A, and 14, coupled, locking disc, 22, will be circumferentially shifted by a determined amount relative to shaft, 14, by claws, $s_1$, thus preventing claws, $s_2$, from passing through the apertures of the locking disc. The locking disc, 22, may be constructed to constantly press against claws, $s_1$, for example, by means of an additional spring (not shown). It is not until torque will start reverting that locking disc, 22, will rotate back to such a position as to permit claws, $s_2$, to pass through the apertures provided therein and to thereby engage with claws, $s_1$.

In this case no provision is made for the locking of free wheeling unit, F. By gearshifting into speeds 1 and 2, the engine can, for instance, when the vehicle is coasting down a steep grade, also be driven by the vehicle with a strong braking action. However, free wheeling unit, F, may be provided in some cases with a locking device. Moreover, for the locking of the two free wheeling units or only one of them, any other clutching system, such as friction clutches or over-running claw couplings may be used in lieu of the so-called "slot clutches." These friction clutches or over-running claw couplings would then have unilaterally bevel-shaped claw front surfaces along the circumferential direction thereof. Variable clutch, 17, can also be provided with overrunning claws or be designed in any other appropriate manner, for example, suitably as a synchronised clutch. The reverse gear assembly can be arranged, for example, according to the same principle as for the first speed gear.

The embodiment according to Fig. 7 differs from the embodiment outlined in Fig. 6 essentially in that free wheeling unit, F, is arranged within the drive transmission gearing of a direct third speed, whereas counter-free wheeling unit, G, is arranged within the drive transmission gearing of a fourth speed (IV) operating as an over-drive. Moreover, the gears for the first and second speeds, contrary to the embodiment outlined in Fig. 6, will couple together shaft, A, and countershaft, 11'. When in first and second speeds, driving power will again be transmitted to axle shaft, B, through the pair of gears, 13' and 12' or 20' and 19', and the pair of gears for the constant speed ratio, 10' and 9'. For gearshifting into second speed, claw coupling half, 17', must be moved into engagement, with clutching teeth of the claw coupling half 18 provided on gear, 20'. For shifting into third speed, claw coupling, 17', will be moved into engagement with key grooves, 21'—acting in the same way as claws—of intermediate shaft, 14', whereby intermediate shaft, 14', which is now rotating at the same rotational speed as shaft, A, will be coupled through free wheeling unit, F, to gear, 9', i. e. to axle shaft, B, in the direction of the driving rotation. When reversion of the direction of the driving rotation occurs, there will be an automatic unclutching at free wheeling unit, F, and a coupling of intermediate shaft, 14', to gear, 16', driven by the countershaft through gear, 15'. The result will that main shaft, A, i. e. the engine will be driven from the vehicle with an overdrive transmission ratio, i. e. with as low a rotational speed as possible. For shifting also into the over-drive position when power flow is normal, i. e. into the fourth speed position of the transmission unit, there will be a locking clutch, S, provided for again which may be for example, of the "slot clutch"-type having again a locking member, 22'. As for the rest, the embodiment according to Fig. 7 is constructed in the same way as for the embodiment according to Fig. 6. If in embodiment according to Fig. 7 the third speed is required to be a reduction, i. e. a speed reduction gearing, and the fourth speed a direct drive, pairs of gears, 16', 15', and 9', 10', will have to be interchanged. The same permutation will be done with free wheeling unit, F, and counter-free wheeling unit, G.

Figure 8:
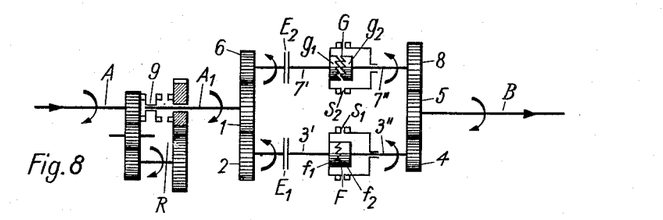

The free wheeling gear outlined in Fig. 8 is driven by shaft, $A_1$. This is driven by the engine either directly through shaft, A, or through reverse speed gear assembly, R. Driving power may be transmitted, as in the case of Figs. 1 and 2, from shaft, $A_1$, to axle shaft, B, either through transmission members, 1, 2, 3', F, 3", 4, 5, with a speed reduction ratio, or through transmission members, 1, 6, 7', G, 7", 8, 5, with a speed increasing ratio. Shifting from forward speed into reverse will be made by a selectively engageable clutch. Moreover, there will be provided locking devices, $S_1$ and $S_2$, for the free wheeling unit F and the counter-free wheeling unit G, as well as—contrary to Figs. 1 and 2—unlocking devices, $E_1$ and $E_2$.

In Fig. 8 it has been taken for granted that the engine drives the vehicle; that shafts, A and $A_1$, are directly coupled by clutch 9, and that shaft, $A_1$ is therefore driven in the forward direction of rotation, e. g. in the clockwise direction when viewed from the engine. Let us moreover assume that clutches, $E_1$ and $E_2$, are clutched or engaged. Axle shaft, B, will therefore be driven through free wheeling unit, F, in a reduction ratio, whereas the transmission of driving power will be interrupted by counter-free wheeling unit, G, since shaft, 7', will revolve counter-clockwise at a rotational speed higher than that of shaft, 7", driven from axle shaft, B, through gears, 5, 8.

Figure 9:
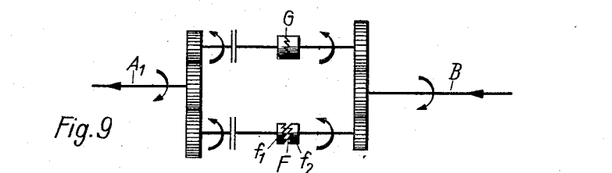

When a reversion of the power flow occurs due to release of the accelerator pedal or owing to an increase in the speed of the vehicle, for example, due to its coasting downhill, driving power will be transmitted, according to Fig. 9, from the axle shaft, B, to drive shaft, $A_1$, through counter-free wheeling unit, G, whereas disengagement of free wheeling unit, F, will occur. The way the mechanism then operates is in this case the same as cin the example outlined in Fig. 2.

Figure 10:
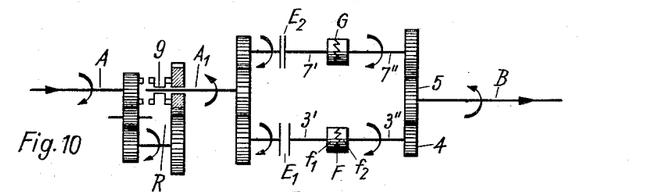

In Fig. 10 it has been taken for granted that the reverse speed gearing, R, is shifted for engagement by clutch, 9, thereby causing shaft, $A_1$, to rotate opposite to shaft, A, i. e. counter-clockwise. Moreover, let us again assume first that unlocking clutches, $E_1$ and $E_2$, are engaged. Shafts, 3' and 7', will rotate clockwise. The result will be that free wheeling unit, F, will not be permitted to transmit drive power from $f_1$ to $f_2$. It rather will be counter-free wheeling unit, G, trying to take over the driving functions and to transmit the driving power to axle shaft, B, through shaft, 7", thus causing the latter to revolve counter-clockwise, i. e., in the reverse direction of rotation. Shaft, 3", too will, however, be driven through gears, 5 and 4, its direction of rotation being the same as that of shaft, 3'. Yet, it will turn at a higher rotational speed according to the speed increasing ratio. Consequently, clutch half, $f_2$, will try to over-run clockwise clutch half, $f_1$, but it will not be permitted to do so by the locking action of free wheeling unit, F. The result will thus be—provided that unlocking devices, $E_1$ and $E_2$ are both securely engaged—that the whole free wheeling assembly will be blocked, thus preventing the driving transmission from taking place. To permit the drive to operate nevertheless, for instance for driving the car backward, one of the two free wheeling units can be unlocked by means of unlocking devices, $E_1$ and $E_2$, respectively. In Fig. 10 the drive is interrupted at $E_1$. The reverse will hence operate through counter-free wheeling unit, G, and transmit torque on to axle shaft, B, with a speed increasing ratio. If, instead, the counter-free wheeling unit, G, is unlocked and driving power in the reverse direction is transmitted through the free wheeling unit, F, the unlocking device, $E_2$, may also be disengaged instead of the unlocking device, $E_1$. In this case, however, it will be necessary to shift into engagement locking device, $S_1$, outlined in Fig. 8, of free wheeling unit, F, thereby causing free wheeling unit, F, to lock. The advantage offered by the transmission of driving power being performed in that way would consist in that axle shaft, B, would rotate at lower a rotational speed and with higher a torque, which is generally more expedient as far as reverse is concerned.

Figure 11:
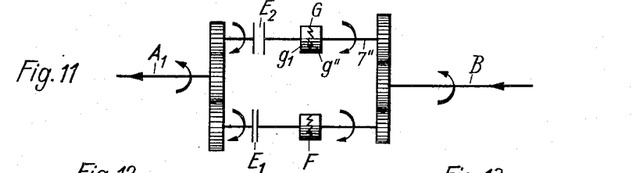

A similar thing happens in the case that the transmission of driving power is performed, according to Fig. 11, from axle shaft, B, in a reverse direction of driving rotation, for instance, when the vehicle has to be driven downhill backward. In this case, should the two unlocking devices, $E_1$ and $E_2$, be engaged—the two free wheeling units being hence permitted to lock in the direction of power flow assigned to them—no transmission of driving power could be performed, since the two free wheeling units would operate against one another, thereby interlocking the transmission unit. By unlocking the counter-free wheeling unit, i. e., by disengaging unlocking device, $E_2$, free wheeling unit, F, may, however, be permitted to take over the transmission of driving power in the direction of drive rotation concerned, and to transmit driving power on to the shaft, $A_1$, and without or appropriately with a reverse speed ratio, on to the engine. Hence under the conditions outlined in this embodiment, the engine will be driven at a higher rotational speed than the shaft, B, which is expedient if a strong braking action by the engine is required.

In the latter case (Fig. 11), instead of unlocking counter-free wheeling unit, G, also free wheeling unit, F, can be unlocked by disengaging unlocking device, $E_1$. In this case it is, however, necessary to lock counter-free wheeling unit, G, by moving into engagement locking device, $S_2$, outlined in Fig. 8, in order to permit the counter-free wheeling unit to take over the drive and to transmit drive power on to clutch half, $g_1$, in the direction of rotation of clutch half, $g_2$. In this case, the engine will be driven at a lower R. P. M., which may under some circumstances be convenient in the way of a more economical operation of the engine from both the viewpoints of wear and fuel consumption. In some cases it will hence suffice to provide for one unlocking device only (e. g. $E_1$) and one locking device (e. g. $S_2$), or also two unlocking devices and one locking device, to make cases c) (Fig. 10) and d) (Fig. 11) practicable. If we want to drop one of these two cases (for instance d), only one unlocking device (e. g. $E_1$) for the normal free wheeling unit) will do in some cases.

By attaching the reverse speed gearing to the rear of the free wheeling gear (i. e. for instance behind axle shaft, B, instead of attaching it behind shaft, A, in Fig. 8) it is not absolutely necessary to provide for an unlocking or locking device or, if so, in any case, only in the event that such drive assembly as it comprises the counter-free wheeling unit is to be used as another normal speed (e. g. as an over-drive), or (in case d) if we want to permit the drive shaft, i. e., the engine, to be driven in reverse direction of rotation too, the latter case occurring for instance when the vehicle is supposed to roll downhill backward with forward gear engaged.

In the case outlined in Fig. 12, free wheeling unit, F, and counter-free wheeling unit, G, are attached in a parallel arrangement to the low range speeds (I, II) and to reverse, R, which low-range and reverse speeds may be selectively and individually engaged in any well-known manner, and wherein drive power is transmitted in these speed ratios from shaft, A, through countershaft, 11″ and the constant drive gearing, 10″, 9″, on to axle shaft, B. To obtain a direct drive, shaft, A, is coupled to an intermediate shaft, 14″, through clutch, 17″, wherein clutch, E₁, is at the same time engaged. Drive power will then be transmitted from shaft, A, direct to axle shaft, B, through intermediate shaft, 11″, and free wheeling unit, F, in a third, direct drive ratio. If a reversion of power flow occurs, and the direct drive gear is engaged, owing to the fact that the vehicle over-runs the engine, free wheeling unit, F, will automatically disengage, whereas counter-free wheeling unit, G, will engage, since drive power will then be transmitted from, B, through pair of gears, 10″, shaft, 11″, and pair of gears, 15″, 16″, on to clutch half, g₁, of counter-free wheeling unit, G, which is rigidly attached to gear, 16″. This drive power transmission occurs in such a way that clutch half, g₁, will engage into clutch half, g₂, which is rigidly attached to shaft, 14″, of counter-free wheeling unit, G, whereby the engine will be driven from the vehicle on in the fourth speed ratio. To render drive practicable also when power flow is normal, through the fourth speed or over-drive, counter-free wheeling unit, G, can be locked by locking device, S₂, which, in the case of Fig. 12, forms e. g. in conjunction with clutch, E₁, a variable coupling.

Drive conditions of the transmission unit with reverse gear engaged are outlined in Fig. 12. Let us suppose first that clutch, E₁, is engaged and that clutch half, f₁, of free wheeling unit, F, is thus coupled to intermediate shaft, 14″. Shafts, A, 11″ and B, will be driven in the direction of rotation indicated by the arrows. Clutch half, f₂, of free wheeling unit, F, will try to drive clutch half, f₁, counter-clockwise. At the same time, clutch half, g₁, of counter-free wheeling unit, G, will be driven by gear, 16″, in the same direction of rotation, but at a lower R. P. M. than shaft, B. If clutch half, f₁, is rigidly attached to intermediate shaft, 14″, clutch half, g₂, which is also rigidly attached to intermediate shaft, 14″, would try to rotate counter-clockwise ahead of clutch half, g₁. This will, however, be impossible due to the locking action of the free wheeling unit: the transmission will thus lock. To render a drive power transmission possible in this case, too, locking clutch, E₁, has to be disengaged, thus interrupting the drive connection between free wheeling unit, F and counter-free wheeling unit, G. The same applies to the case occurring when the vehicle over-runs the engine. In such a case, an interchange of functions on part of drive shaft and axle shaft occurs, i. e., the axle shaft becomes drive shaft and vice-versa. Due to the free wheeling units being attached in parallel arrangement with respect to the reverse speed gearing, reversion of power flow will not change anything as regards the kinematic conditions in the free wheeling and counter-free wheeling units.

In the example of embodiment outlined in Fig. 13, the normal free wheeling unit is arranged in the drive assembly of a first and second speed (I, II), and reverse R. The individual forward and reverse speed ratios may be selectively and individually engaged in any well-known manner, as, for example, by means of movable jaw elements, shifting sleeves and the like. Counter-free wheeling unit, G, is directly attached to drive shaft, A, driven through clutch, K, and couples shaft, A, directly to axle shaft, B. When reversion of power flow occurs in forward speed, drive power will be transmitted to the engine in direct drive through counter free wheeling unit, G. By gear-shifting into reverse speed, countershaft, 11‴, will be driven clockwise as indicated in the drawing. Since such a drive power transmission cannot be performed by the free wheeling unit, it will be necessary, in this case, to lock same by locking device, S₁. Axle shaft, B, will hence be driven in reverse direction of rotation, i. e. (as the drawing shows) counterclockwise. As shafts, A and B, are herein rotating opposite to each other, i. e. in such a way that the clutch halves of counter free wheeling unit, G, disengage, drive power can readily be transmitted, upon locking free wheeling unit, F, through the reverse speed, counter free wheeling unit, G, on to axle shaft, B. The same applies to the case occurring when there is a reversion of power flow, and the engine is driven out of the vehicle, for instance when the latter is rolling downhill backward. Counter free wheeling unit, G, offers herein the possibility to have drive power transmitted through free wheeling unit, F: for this direction of power flow, however, there is no need of locking it. Counter-free wheeling unit, G, could obviously be provided with a locking device also in the case outlined in Fig. 13, so as to render it possible to have drive power transmitted in direct speed from the engine on through counter free wheeling unit, G, for instance by eliminating or uncoupling locking device, S₁, for free wheeling unit, F. In some cases, shaft, A, can also be parted in such a way that an outside hollow gear shaft will couple engine, M, to clutch, K, and an inside shaft will couple engine direct to counter free wheeling unit, G, by evading clutch, K.

In the case that reverse speed gear, R, is attached in front of counter-free wheeling unit, G, the latter can be directly used for the transmission of reverse drive power. To prevent drive power transmission to the engine from being interrupted when the car is moving backward, the counter-free wheeling unit can be so designed as to permit its locking, or a reverse speed transmission through free wheeling unit, F, can at the same time be provided for.

The invention is not limited to the examples of embodiment outlined and explained in the foregoing. In particular, the free wheeling units, the unlocking devices and the locking devices can be designed in any suitable and desirable way. For instance, free wheeling units herein used can also be the clamp ratchet type, with rollers, balls or the like, in lieu of the over-running claw couplings outlined herein for clarity and simplicity sake. The unlocking devices can be arranged within, or attached to, the free wheeling units or arranged in any place desired of the drive assembly enclosing the free wheeling unit concerned, as outlined for instance in figures from 8–11, provided this unlocking renders it possible to obtain the same effect as the unlocking of the free wheeling unit. Locking can for instance be also actuated by shifting into engagement another drive gearing. In lieu of only one reverse speed gearing, two or more can be provided for, and attached e. g. in different points of the drive system. Unlocking and locking operations can either be performed manually or automatically, for instance in a way dependent of the direction of drive rotation or of the gearshifting into reverse. The control of the unlocking device can for instance be so designed and be coupled to the gearshifting device in such a way that unlocking will be operated or practicable only upon gearshifting into reverse. This would in some cases prevent engine from being for instance driven in a wrong direction of rotation out of the vehicle.

Gearshift, and engagement of the locking devices, respectively, can be performed either by hand or automatically, for instance in a way dependent of the R. P. M. and the torque, or directly or else upon pre-selection. The automatic gearshifting can be performed in any way desired, e. g. by means of an auxiliary power source, pneumatically, hydraulically, electrically or the like. The upshifting from direct drive position into the over-drive, or from such low range speed as it encloses the free wheeling unit, F, into such high range speed as it comprises counter free wheeling unit, G (e. g. by locking the counter free wheeling unit or by an alternate locking of the two free wheeling units) can be herein performed according to a sliding scale i. e. in such a way that when power consumption of the engine is low (for instance when the accelerator is depressed), gearshifting into the higher speed will be performed at a vehicle speed which will be lower than in the case of a higher power consumption (for instance when the accelerator is pressed down). The downshifting can be operated in the same way or also with a constant vehicle speed. Moreover, downshifting can for instance be performed when the accelerator pedal is pressed down beyond its normal full load position.

What I claim is:

1. In a drive mechanism, two terminal shafts consisting of a drive shaft and a driven axle shaft; an intermediate shaft; a countershaft; gearing members providing a drive connection between said countershaft and one of said two terminal shafts; gearing members providing a reverse speed transmission between the other terminal shaft and said countershaft; means for coupling said last-mentioned terminal shaft to said intermediate shaft; a free wheeling device operatively connected with the gearing members providing a drive connection from said intermediate shaft on to said countershaft; another free wheeling device operatively connected between said intermediate shaft and said first mentioned terminal shaft whereby the two free wheeling devices will provide a drive power transmission in two directions opposite to one another; and an uncoupling device operatively connected in the intermediate shaft, for disengaging such coupling devices of the two free wheeling units as are connected to the intermediate shaft.

2. In a drive mechanism, the combination according to claim 1, wherein the first mentioned terminal shaft is the axle shaft; the second mentioned terminal shaft is the driven drive shaft; the second mentioned free wheeling device provides a transmission of driving power from said drive shaft on to said driven axle shaft in direct drive, and the first mentioned free wheeling device provides a transmission of driving power from said driven axle shaft on to said drive shaft through said countershaft in an over-drive.

3. In a drive mechanism, the combination according to claim 1, with a locking device provided for one of said two free wheeling devices.

4. In a drive mechanism, a drive shaft, an axle shaft, a pair of intermediate shafts, means for drivingly connecting said pair of intermediate shafts in parallel to said drive shaft and to said axle shaft, a free-wheeling means in one of said intermediate shafts for transmitting driving power only from the drive side to the axle side of said mechanism during forward direction of driving rotation, another free-wheeling means in the other of said intermediate shafts for transmitting driving power only from the axle side to the drive side of said mechanism during said forward direction of driving rotation, gear means for reversing the direction of driving rotation, and unlocking means in one of said intermediate shafts for interrupting the transmission thereof in both directions of driving rotation.

5. In a drive mechanism, the combination according to claim 4, wherein said first-named means includes spur gears for transmitting the drive from said drive shaft to said intermediate shafts and from said intermediate shafts to said axle shaft.

6. In a drive mechanism, wherein the drive branch includes at least two drive ramifications branching out on the drive side of said mechanism and uniting again on the driven axle side thereof and a transmission gearing means for producing during flow of power in the normal direction a transmission of driving power in one of said ramifications at a higher speed than in the other, the improvement comprising gear means for reversing the direction of driving rotation, a free-wheeling means in the ramification producing the relatively lower speed for transmitting driving power during forward direction of driving rotation only in said normal direction, another free-wheeling means in the other ramification for transmitting driving power during forward direction of driving rotation only in a direction opposite to said normal direction, at least one locking means for one of said free-wheeling means for transmitting power therethrough in forward and reverse direction of driving rotation, and at least one unlocking means for the other of said free-wheeling means for interrupting the transmission therethrough in both forward and reverse direction of driving rotation.

7. In a drive mechanism having a drive side and a driven axle side, a drive branch consisting of at least two drive ramifications branching out on the drive side of said mechanism and uniting again on the driven axle side thereof, a free-wheeling means in one of said drive ramifications for transmitting driving power only from the drive side to the axle side of said mechanism during forward direction of driving rotation, another free-wheeling means in the other drive ramification for transmitting driving power only from the axle side to the drive side of said mechanism during said forward direction of driving rotation, selectively engageable gear means in said mechanism for effecting reversal of the direction of driving rotation, and disengaging means in one of said drive ramifications having one of said free-wheeling means for effectively interrupting the transmission in one of said two drive ramifications in both directions of driving rotation.

8. In a drive mechanism for transmitting a driving power from the drive side to the axle side of said mechanism and vice versa during forward and reverse directions of driving rotations, a drive branch consisting of at least two drive ramifications branching out on the drive side of said mechanism and uniting again on the driven axle side thereof, a free-wheeling means in one of said drive ramifications for transmitting driving power only from the drive side to the axle side of said vehicle during forward direction of driving rotation, another free-wheeling means in the other drive ramification for transmitting driving power only from the axle side to the drive side of said vehicle during said forward direction of driving rotation, an unlocking means in the drive ramification containing said first-named free-wheeling means for interrupting the transmission thereof, another unlocking means in said other drive ramification for interrupting the transmission thereof, and locking means for said first-named free-wheeling means for transmitting driving power therethrough in both forward and reverse directions of driving rotation.

9. In a drive mechanism, a drive shaft, a drive reversing means, a gear unit having at least two gear ratios to provide two speeds attached to the rear of said reversing means, one of said gear ratios reducing the transmission by said gear unit to a lower rotational velocity than the other gear ratio, an axle shaft, a free-wheeling means for transmitting driving power during forward direction of driving rotation from said drive shaft to said axle shaft through the gear ratio producing the relatively lower rotational velocity, another free-wheeling means for transmitting driving power during forward direction of driving rotation from said axle shaft to said drive shaft through the gear ratio producing a relatively higher rotational velocity, and unlocking means in the gear ratio producing said relatively lower rotational velocity for interrupting the transmission therethrough.

10. In a drive mechanism, the combination according to claim 9, further comprising another unlocking means in the gear ratio producing said relatively higher rotational velocity for interrupting the transmission therethrough, and at least one locking means for said first-named free-wheeling means for transmitting driving power therethrough during forward and reverse directions of driving rotation.

11. In a drive mechanism with a drive side and a driven axle side and including a multi-speed transmission unit having at least two parallel branches and a reverse speed means in one of said branches, a free-wheeling means in one branch of said transmission containing said reverse speed means, another free-wheeling means in the other branch of said transmission, one of said free-wheeling means being operative to transmit driving power only from the drive side to the driven axle side during forward direction of driving rotation and the other of said free-wheeling means being operative to transmit driving power only from the axle side to the drive side of said mechanism during said forward direction of driving rotation, and locking means for rendering at least one of said free-wheeling means operative to transmit driving power in both directions.

12. In a drive mechanism, the combination according to claim 11, wherein said locking means is operative with said first-named free-wheeling device.

13. In a drive mechanism having a drive side and a driven axle side, a drive branch consisting of at least two drive ramifications dividing out on the drive side of said mechanism and uniting again on the driven axle side thereof, a free-wheeling means in one of said drive ramifications for transmitting driving power only from the drive side to the axle side of said mechanism during forward direction of driving rotation, another free-wheeling means operatively connected with the other drive ramification for transmitting driving power only from the axle side to the drive side of said mechanism during said forward direction of driving rotation, gear means in said drive mechanism for effective reversal of the direction of driving rotation, and means in one of said drive ramifications provided with one of said free-wheeling means for effectively interrupting the transmission of one of said two drive ramifications in both directions of driving rotation.

14. In a drive mechanism the combination according to claim 13, wherein at least one of said two free wheeling means is provided with a locking clutch of the synchronized type, said clutch being adapted to lock the said one free wheeling means when the individual velocities of the free wheeling coupling halves are the same.

15. In a drive mechanism, a drive shaft, a drive reversing means, a gear unit having at least two different gear ratios to provide two speeds attached to the rear of said reversing means, one of said gear ratios producing a transmission by said gear unit of a lower rotational speed than the other gear ratio, an axle shaft, a free-wheeling means for transmitting driving power during forward direction of driving rotation from said drive shaft to said axle shaft through the gear ratio producing the relatively lower rotational speed, another free-wheeling means for transmitting drive power during said forward direction of driving rotation from said axle shaft to said drive shaft through the gear ratio producing the relatively higher rotational speed, and means in the gear ratio producing said relatively lower rotational speed for interrupting the transmission therethrough.

16. In a drive mechanism with a drive side and a driven axle side and including a multi-speed transmission unit having at least two parallel branches and a reverse speed means operatively connected with one of said branches, a free-wheeling means drivingly connected with the branch of said transmission connected with said reverse speed means, another free-wheeling means in the other branch of said transmission, one of said free-wheeling means being operative to transmit driving power only from the drive side to the axle side of said mechanism during forward direction of driving rotation and the other of said free-wheeling means being operative to transmit driving power only from the axle side to the drive side of said mechanism during said forward direction of driving rotation, and locking means for rendering at least one of said free-wheeling means operative to transmit driving power in both directions.

17. In a drive mechanism the combination according to claim 13, wherein said one drive ramification during transmission of driving power from the drive side to the axle side of said mechanism during forward direction of driving rotation provides a direct drive transmission of a 1:1 ratio, and wherein said other drive ramification during transmission of driving power from the drive side to the axle side of said mechanism during forward direction of driving rotation provides an overdrive transmission with an increased transmission ratio.

18. In a drive mechanism the combination according to claim 16, further comprising means in said drive mechanism for preventing the transmission of power through either of said two free-wheeling means in at least one speed of said drive mechanism.

19. In a drive mechanism the combination according to claim 16, wherein said first-mentioned free-wheeling means provides a transmission of power during said forward direction of driving rotation through the second highest gear ratio, and wherein the second-mentioned free-wheeling means provides a transmission of driving power during forward direction of driving rotation through the highest gear ratio of said multi-speed transmission.

20. In a drive mechanism the combination according to claim 13, wherein said drive side comprises a drive shaft and wherein said driven axle side comprises an axle shaft, one of said drive ramifications comprising one intermediate shaft coaxial with said drive shaft and said axle shaft, and the other drive ramification comprising another intermediate shaft in parallel with said first-mentioned intermediate shaft but displaced therefrom, and wherein said last-mentioned means includes spur gears drivingly connecting said drive shaft with said second-mentioned intermediate shaft, and further spur gears for drivingly connecting and said second-mentioned intermediate shaft with said axle shaft.

21. In a drive mechanism the combination according to claim 13, wherein at least one of said two free-wheeling means includes locking means with friction coupling members.

22. In a drive mechanism, a drive shaft, an intermediate shaft, a driven axle shaft, said intermediate shaft being coaxial with at least one of the other two aforementioned shafts, a counter-shaft, selectively engageable gear means for drivingly connecting said drive shaft with said counter-shaft and said counter-shaft with said driven axle shaft, gear means for drivingly connecting said intermediate shaft with said counter-shaft, free-wheeling means for providing a direct drive connection from said drive shaft over said intermediate shaft to said driven shaft, and free-wheeling means for transmitting power only from said axle shaft to said drive shaft during forward direction of driving rotation to provide a transmission through the gear means connecting said intermediate shaft with said counter-shaft.

23. In a drive mechanism, a drive shaft, an intermediate shaft, a driven axle shaft, said intermediate shaft being coaxial with at least one of the other two aforementioned shafts, a counter-shaft, gear means for drivingly connecting said intermediate shaft with said counter-shaft and for drivingly connecting said counter-shaft with said driven axle shaft, free-wheeling means for providing a direct drive connection between said drive shaft and said driven shaft over said intermediate shaft in only one direction of power transmission, and free-wheeling means operative to provide a transmission of power through said gear means to transmit power between said drive shaft and said driven shaft over said counter-shaft in only the other direction of power transmission during the forward driving rotation of said driven shaft, said directions indicating a transmission of power either from said drive shaft to said driven axle shaft or from said driven axle shaft to said drive shaft.

24. In a drive mechanism the combination according to claim 23, further comprising a plurality of gear members in said gear means, and means for selectively shifting said gear members into and out of engagement with one another.

25. In a drive mechanism having a drive side and a driven axle side and including a multi-speed transmission unit with a drive branch, a free-wheeling means for transmitting power from said drive side to said driven side in one of the forward speeds during the forward direction of driving rotation, another free-wheeling means for transmitting power from said driven side to said drive side in another forward speed during said forward direction of driving rotation, reverse means for reversing the drive and operatively connected between said drive side and said driven axle side to provide the transmission of power in reverse through said drive branch in by-passing relationship with said free-wheeling means, each of said free-wheeling means including interlocking coupling halves with one coupling half of each of said free-wheeling means operatively connected at all times to said drive branch, another drive branch independent of said first-mentioned drive branch between said drive side and said driven axle side, the other halves of said free-wheeling means being connected with one another through said another drive branch, and uncoupling means in said another drive branch for disconnecting the second-mentioned coupling halves of said free-wheeling means.

26. In a drive mechanism the combination according to claim 13, further comprising means for shifting said reversing gear means into and out of engagement, and means for operating said means for interrupting the transmission in dependence upon said shifting means.

27. In a drive mechanism the combination according to claim 23, wherein said two freewheeling means are arranged on said intermediate shaft.

28. In a drive mechanism the combination according to claim 23, wherein said second-mentioned free wheeling means provides a transmission of driving power in the normal forward direction of driving rotation and is operative to provide such transmission of driving power through said counter shaft in a relatively lower speed, wherein said first-mentioned free wheeling device provides a transmission of driving power in a forward direction of rotation in the opposite direction from said second-mentioned free wheeling means, said first-mentioned free wheeling means producing a direct drive by coupling together the shafts which are arranged coaxially to each other, and wherein said gear means includes gearing members coupling said driven axle shaft with said counter shaft and means for selectively engaging said last-mentioned gearing members.

References Cited in the file of this patent

UNITED STATES PATENTS

| | | |
|---|---|---|
| 1,843,523 | Starkey | Feb. 2, 1932 |
| 1,979,077 | Piloar | Oct. 30, 1934 |
| 2,246,996 | Kreis | June 24, 1941 |
| 2,256,960 | Neracher et al. | Sept. 23, 1941 |
| 2,258,684 | Lysholm et al. | Oct. 14, 1941 |
| 2,457,692 | La Brie | Dec. 28, 1948 |
| 2,466,318 | Kohr | Apr. 5, 1949 |
| 2,560,886 | Orr | July 17, 1951 |
| 2,590,472 | Soper et al. | Mar. 25, 1952 |

FOREIGN PATENTS

| | | |
|---|---|---|
| 479,293 | France | Dec. 11, 1915 |
| 596,307 | Great Britain | Jan. 1, 1948 |